United States Patent
Fukuda et al.

(10) Patent No.: US 9,325,815 B2
(45) Date of Patent: Apr. 26, 2016

(54) CORDLESS TELEPHONE APPARATUS AND CONTROL METHOD OF THE SAME

(71) Applicant: Panasonic Intellectual Property Management Co., Ltd., Osaka (JP)

(72) Inventors: Hikaru Fukuda, Fukuoka (JP); Hideyuki Matsuo, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 4 days.

(21) Appl. No.: 14/547,910

(22) Filed: Nov. 19, 2014

(65) Prior Publication Data

US 2015/0148027 A1 May 28, 2015

(30) Foreign Application Priority Data

Nov. 22, 2013 (JP) ................................. 2013-242171

(51) Int. Cl.
*H04M 3/00* (2006.01)
*H04M 1/02* (2006.01)
*H04M 1/725* (2006.01)
*H04R 5/04* (2006.01)

(52) U.S. Cl.
CPC ........ *H04M 1/0202* (2013.01); *H04M 1/72502* (2013.01); *H04M 1/72558* (2013.01);
(Continued)

(58) Field of Classification Search
CPC .......... H04M 1/0202; H04M 1/72558; H04M 1/72502; H04M 1/6066; H04R 2420/07; H04R 2430/01; H04R 5/04; H04R 2227/005; H04R 2205/021
USPC ............... 455/420; 340/12.3, 4.31; 348/14.05
See application file for complete search history.

(56) References Cited

U.S. PATENT DOCUMENTS

| | | | | |
|---|---|---|---|---|
| 5,802,467 A | * | 9/1998 | Salazar | H04B 10/1149 340/12.3 |
| 7,650,145 B2 | * | 1/2010 | Ukita | H04M 1/6066 348/14.05 |

(Continued)

FOREIGN PATENT DOCUMENTS

| | | |
|---|---|---|
| EP | 1 104 150 A2 | 5/2001 |
| EP | 1 833 232 A2 | 9/2007 |

(Continued)

OTHER PUBLICATIONS

Extended European Search Report dated Mar. 23, 2015, for corresponding EP Application No. 14194133.6-1972, 12 pages.

(Continued)

*Primary Examiner* — Allahyar Kasraian
*Assistant Examiner* — Farid Seyedvosoghi
(74) *Attorney, Agent, or Firm* — Seed IP Law Group PLLC (57) ABSTRACT

A cordless telephone apparatus comprises a portable handset and a base station. The base station including a first wireless communication unit which, in operation, communicates data with a music player, a first control unit which, in operation, monitors a status of the music player and remotely controls the music player via the first wireless communication unit, a speaker which outputs audio data, an audio processing unit which, in operation, reproduces the audio data received by the first wireless communication unit from the music player and outputs the audio data to the speaker, a second wireless communication unit which wirelessly communicates data with the portable handset; and a second control unit which, in operation, controls the portable handset as an operation unit to remotely control the music player.

18 Claims, 5 Drawing Sheets

(52) U.S. Cl.
CPC ............ *H04R 5/04* (2013.01); *H04R 2205/021* (2013.01); *H04R 2227/005* (2013.01); *H04R 2420/07* (2013.01); *H04R 2430/01* (2013.01)

(56) References Cited

U.S. PATENT DOCUMENTS

2007/0286432 A1   12/2007   Shin et al.
2011/0032071 A1*   2/2011   Tondering .............. H04B 1/202
                                                        340/4.31

FOREIGN PATENT DOCUMENTS

| JP | 63-187844 A | 8/1988 |
| JP | 11-154999 A | 6/1999 |
| JP | 2000-253448 A | 9/2000 |
| JP | 2002-281120 A | 9/2002 |
| JP | 2006-005617 A | 1/2006 |
| JP | 2006-25020 A | 1/2006 |
| JP | 2007-336511 A | 12/2007 |

OTHER PUBLICATIONS

Gigaset Communications Gmbh: "Gigaset DX800A All In One Bedienungsanleitung" Dec. 31, 2010, pp. 1-204.
Gigaset Communications Gmbh: "Gigaset DX800A All In One User Guide" 2011, pp. 1-194.
Bluetooth Doc, "AU—Audio Video Working Group—Audio/Video Remote Control Profile" Jun. 26, 2008, pp. 1-166.

* cited by examiner

CORDLESS TELEPHONE APPARATUS AND CONTROL METHOD OF THE SAME

BACKGROUND

The present invention relates to a cordless telephone apparatus and a control method of the same.

In recent years, various portable music players which have a function to play music have become common. A dedicated external speaker can be connected to the portable music player to listen to music, which is stored in the portable music player, more loudly. The portable music player can be a mobile phone (e.g. a smartphone and a cellular phone) that include a function of music player as well as a dedicated music player.

JP-A-2007-336511 describes a conventional technique of portable music player, which is that a mobile music player is wirelessly connected to a dedicated external speaker via wireless receiving pack.

Also, telephone apparatuses which are capable of connecting to a fixed line are often installed at typical homes and offices. JP-A-2000-253448 and JP-A-2006-025020 show conventional technologies regarding cordless telephone apparatuses.

However, the cordless telephone apparatus of JP-A-2000-253448 and JP-A-2006-025020 is not used as the external speaker of JP-A-2007-336511. Therefore, the dedicated external speaker is necessary other than the cordless telephone apparatus.

SUMMARY

According to one aspect of the present invention, cordless telephone apparatus and control method of the same are provided to enhance function linkage between a music player and a cordless telephone apparatus when the music player reproduces audio data.

According to one embodiment, a cordless telephone apparatus comprises a portable handset and a base station. The base station includes a first wireless communication unit which, in operation, communicates data with a music player and a first control unit which, in operation, controls a status of the music player and remotely controls the music player via the first wireless communication unit. Also, the base station includes a speaker which outputs audio data and an audio processing unit which, in operation, reproduces the audio data received by the first wireless communication unit from the music player and outputs the audio data to the speaker. Furthermore the base station includes a second wireless communication unit which wirelessly communicates data with the portable handset and a second control unit which, in operation, controls the portable handset as an operation unit to remotely control the music player. When the second control unit receives from the portable handset first key information defined to remotely control the music player, the second control unit transmits to the music player remote control information which corresponds to the first key information. And when the second control unit receives from the portable handset second key information defined to adjust a volume, the second control unit controls the volume of the speaker without remotely controlling the music player.

According to other aspect of the present invention, a cordless telephone apparatus comprises a portable handset and a base station. The base station includes a first wireless communication unit which, in operation, communicates data with a music player. The base station also includes a speaker which outputs audio data, and an audio processing unit which, in operation, reproduces the audio data received by the first wireless communication unit from the music player and outputs the audio data to the speaker. Furthermore, the base station includes a second wireless communication unit which wirelessly communicates data with the portable handset and a control unit which controls a volume of the speaker when the speaker outputs the audio data from the music player and when the second wireless communication unit receives from the portable handset key information defined to adjust the volume.

According to other aspect of the present invention, regarding a control method implemented by a base station of a cordless telephone system, which includes a portable handset and the base station, the method comprising connecting to a music player wirelessly, outputting audio data, which the base station receives from the music player, to a speaker of the base station, transmitting display information for remotely controlling the music player to the portable handset when the base station receives link start information for starting remote-control of the music player, wherein. When the base station receives from the portable handset first key information defined to remotely control the music player, the base station transmits to the music player remote control information which corresponds to the first key information. And when the base station receives from the portable handset second key information defined to adjust a volume, the base station controls the volume of the speaker without remotely controlling the music player.

According to other aspect of the present invention, regarding a control method implemented by a base station of a cordless telephone system, which includes a portable handset and the base station, the method comprising connecting to a music player wirelessly, outputting audio data, which the base station receives from the music player, to a speaker of the base station and controlling a volume of the speaker of the base station when the speaker outputs the audio data from the music player and when the base station receives from the portable handset key information defined to adjust the volume.

DETAILED DESCRIPTION OF EXEMPLARY EMBODIMENTS

An embodiment of the present invention will be described with reference to the accompanying drawings.

In JP-A-2007-336511, for example, a user has to buy a dedicated external speaker unit to listen to music under preferable environment at home. Also, the external speaker only outputs sounds and it is hard to improve, for example, sound quality and volume with the external speaker.

Also, if the portable music player is mounted on the external speaker to connect to each other, the operability of the portable music player is degraded. The user has to move to near the external speaker from where they listened to music in order to operate the portable music player to control functions such as volume control, choice of music, and start/pause procedure.

It is preferable that telephone apparatuses showed in JP-A-2000-253448 and JP-A-2006-025020 are used as the external speakers.

In JP-A-2000-253448, in a cordless telephone system, a communication mode of cellular phone is switched between a public mode and a private mode by use of PHS (Personal Handy-phone System) technology. In this technology, a single mobile terminal can be used both as a cellular phone outside and as a handset of cordless telephone system indoors.

In JP-A-2006-025020, a telephone apparatus system has a wireless IP telephone terminal connected to a master phone which includes a telephone network control circuit and a digital wireless communication unit. The wireless IP phone terminal is used as an internet wireless telephone terminal. The telephone network control circuit corresponds to a fixed-line phone network communication unit. The digital wireless communication unit corresponds to a wireless LAN communication unit. The wireless IP phone terminal corresponds to a handset.

However, even if the telephone apparatus is simply used as the external speaker of the portable music player, the operability of the portable music player doesn't change when the external music player is used.

Also, there can be incoming and outgoing calls while a speaker of the telephone apparatus outputs music which is played by the portable music player. Then, this music sound can interfere phone conversations.

A cordless telephone apparatus and a control method of the same which may improve function linkage between a music player and a cordless telephone apparatus when the music player reproduces audio data are explained below.

First Embodiment of the Present Invention

Figure 1:
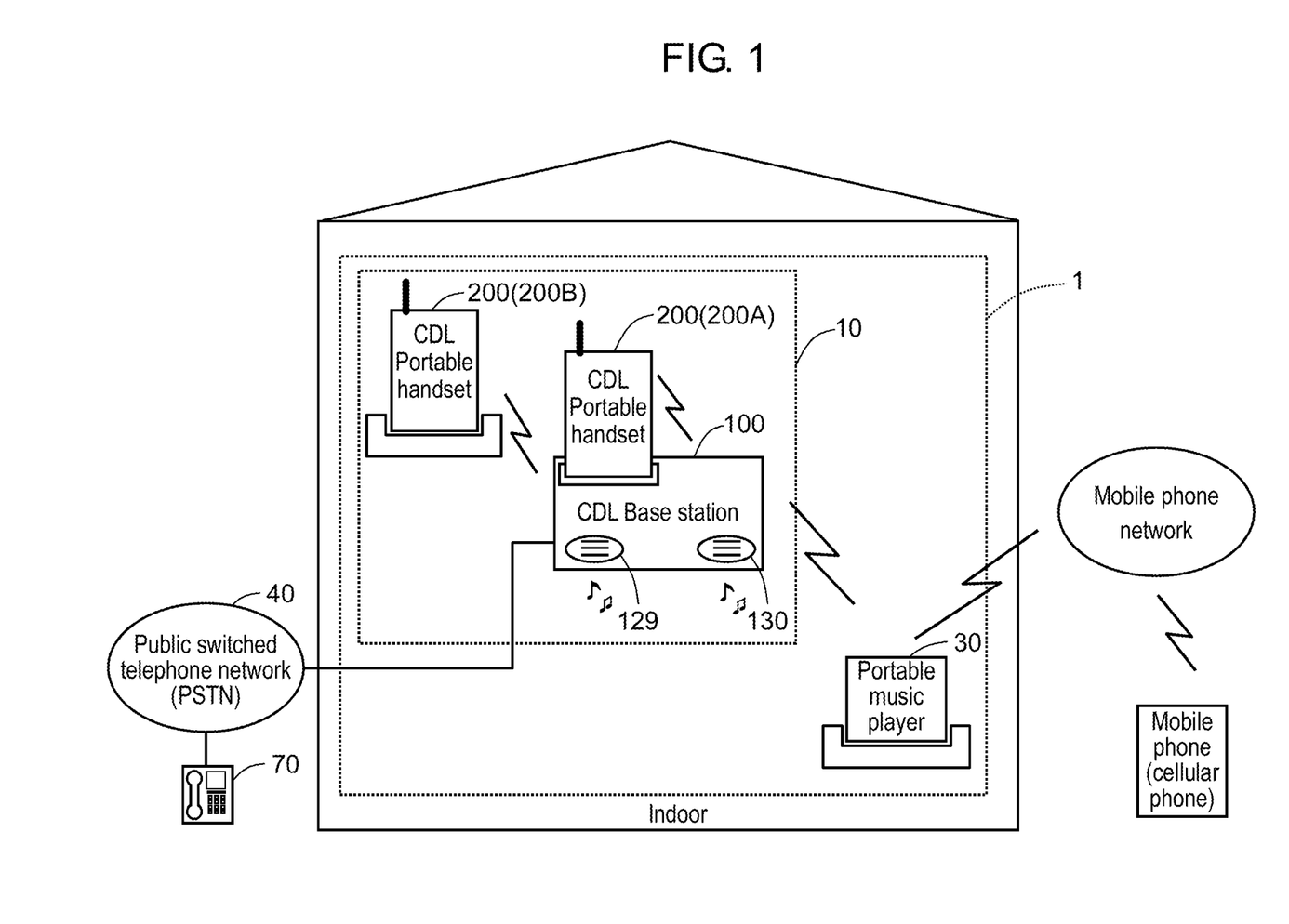
FIG. 1 is a block diagram showing the configuration of a cordless telephone system in accordance with an embodiment of the present invention.

FIG. 1 is a block diagram showing the configuration of a cordless telephone system in accordance with an embodiment of the present invention.

A cordless telephone system 1 includes a cordless telephone apparatus 10 and a portable music player 30. The cordless telephone apparatus 10 includes a base station 100 and a portable handset 200 (200A and 200B). Though the cordless telephone apparatus 10 has the two portable handsets 200A and 200B in FIG. 1, the cordless telephone apparatus 10 may have one or more than three handsets.

The base station 100 connects to a phone line of a public switched telephone network (PSTN) 40. A phone user can carry the portable handset 200 freely within the home and use it, for example, because the base station 100 and the portable handset 200 connect wirelessly.

The base station 100 connects and communicate (e.g. telephone call) with other telephone apparatus 70 via the PSTN 40.

The cordless telephone apparatus 10 can use a wireless communication technology which is used by publicly known cordless telephone systems, such as PHS which is used within a frequency band of 1.9 GHz, DECT (Digital Enhanced Cordless Telecommunications) system, and WDCT (Worldwide Digital Cordless Telephone) system which is used within a frequency band of 2.4 GHz, as a communication method between the base station 100 and the portable handset 200.

The base station 100 has a function to link with the portable music player 30. The portable music player 30 may be, for example, a mobile terminal which is a dedicated music player or a mobile terminal which has an audio-playing application. This mobile terminal may be a cellular phone terminal or a smartphone. An immobile music player can be used instead of the mobile music player 30.

A communication method of the short range radio communication technology within the home, such as IEEE 802.15.1 (Bluetooth), IEEE 802.11 (wireless LAN), and IEEE 802.15.4 (Zigbee), is applicable for a wireless communication method between the base station 100 and the portable music player 30. The following explanation is an example of the cooperative operation between the base station 100 and the portable music player 30 when the base station 100 and the portable music player 30 wirelessly connect to each other by Bluetooth as a wireless communication method.

The communication method between the base station 100 and the portable music player 30 does not need to be wireless communication and wire communication is also applicable.

When the portable music player 30 reproduces audio data (voice data), speakers 129 and 130 of the base station 100 may output the data. In other words, the speakers 129 and 130 of the base station 100 can be used as an external speaker of the portable music player 30.

The audio data, which the portable music player 30 outputs, may be, for example, music data, voice data of recorded conversation, ambient sound data, and other audio data which can be reproduced by common music players. When the portable music player 30 outputs audio data, the portable handset 200 may remotely control the portable music player 30 via the base station 100. In other words, the portable handset 200 of the cordless telephone apparatus 10 may be used as a remote controller of the portable music player 30.

Figure 2:
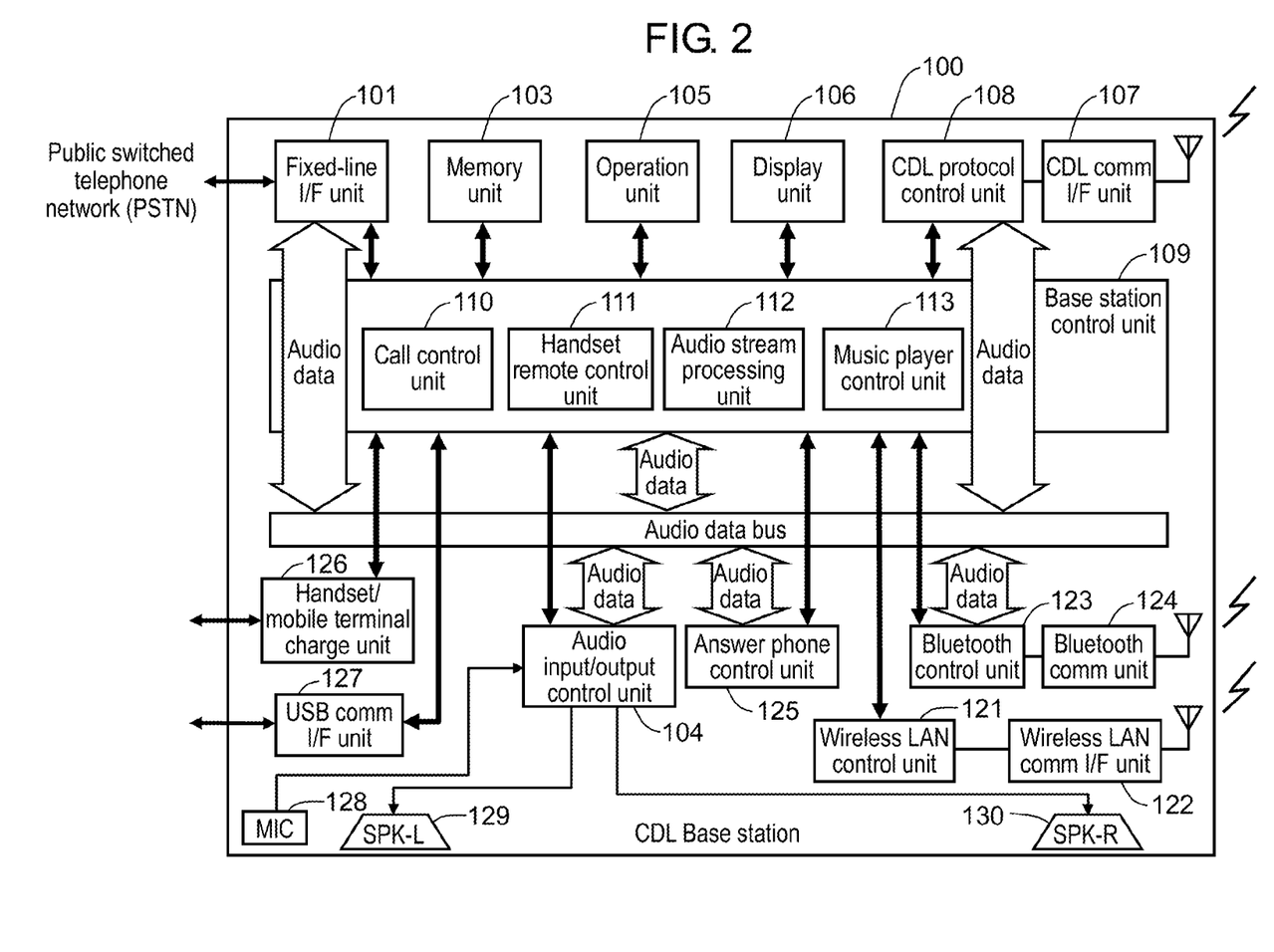
FIG. 2 is a block diagram showing the configuration of a base station in accordance with an embodiment of the present invention.

Next is an explanation of an example of the base station 100. FIG. 2 is a block diagram showing the configuration of a base station.

Hereafter, the "cordless telephone" may be referred to a "CDL".

The base station 100 includes a fixed-line I/F (interface) unit 101, memory unit 103, an audio input/output control unit 104, an operation unit 105, a display unit 106, a CDL comm I/F unit 107, and a CDL protocol control unit 108. Also, the base station 100 includes a base station control unit 109, a wireless LAN control unit 121, a wireless LAN comm I/F unit 122, a Bluetooth control unit 123, and a Bluetooth comm I/F unit 124. Furthermore, the base station 100 includes an answer phone control unit 125, a handset/mobile terminal charge unit 126, USB (Universal Serial Bus) comm I/F unit 127, a microphone 128 (MIC), and speakers 129 and 130 (SPK-L and SPK-R).

The base station control unit 109 includes a call control unit 110, a handset remote control unit 111, an audio stream processing unit 112, and a music player control unit 113.

The fixed-line I/F unit 101 includes a Network Control Unit (NCU) and a modem. The NCU controls the phone network. For example, the NCU detects a call-in, and then acquires and connects to the PSTN 40 at the time of the call-request. The modem, for example, receives information such as a caller ID from the PSTN 40 at the time of call-in. Also, the fixed-line IF unit 101 may connect to not only an analog phone line but also a digital phone line such as an ISDN line and an IP phone line.

The memory unit 103 includes a volatile memory (RAM) and a non-volatile memory (ROM, EPROM, or the like). Various programs and various kinds of information such as various parameters for setting an operating condition of the cordless telephone apparatus 10, telephone book information, and a list of incoming and outgoing calls are stored in the memory unit 103.

The audio input/output control unit 104 converts the digital audio data, which is from the audio bus, to analog audio data and controls the speakers 129 and 130 to output the analog audio. Also, the audio input/output control unit 104 controls output volume and sound quality according to commands (directives) by the base station control unit 109. Furthermore, the audio input/output control unit 104 converts analog sound, which is received by the microphone 128, into digital sound and control voice bus to transmit it. The microphone 128 and the speakers 129 and 130 are used for hands-free communication.

Also an audio signal, which is output from the speakers 129 and 130, includes, for example, a ringtone, audio date which is output by the portable music player 30 as well as telephone voice. The speaker 129, 130 are used to output the ringtone and used as the external speaker of the portable music player 30. The speakers 129 and 130 output stereo audio or monophonic audio according to the audio data which is transmitted to the audio input/output control unit 104.

The operation unit 105 may include a plurality of buttons which can be used by a user and the user inputs operation information with the operation unit 105. The buttons may include, for example, dial keys which are necessary to make a call, function keys, which have various functions, such as a play key, a stop key, and a pause key, for controlling the portable music player 30, a volume control key for adjusting a volume of the speaker 129 and 130, a soft key for activating a function which is displayed according to a display position.

The display unit 106 includes, for example, a liquid crystal display and a driver thereof and shows various information such as telephone number information, information about the other side of the communication, and operation guide information.

The CDL comm I/F unit 107 includes a transmitting and receiving circuit for communicating with the portable handset 200 wirelessly. The CDL comm I/F unit 107 is a RF (Radio Frequency) unit which transmits and receives signals wirelessly by use of an antenna.

The CDL protocol control unit 108 is a protocol stack unit which transmits and receives data to/from the portable handset 200. The CDL protocol control unit 108 performs protocol control according to a controlling protocol (for example, DECT protocol, PHS protocol) used between the base station 100 and the portable handset 200.

The base station control unit 109 may include, for example, a hardware which mainly includes a microcomputer. The base station control unit 109 runs a program which is incorporated in advance, and executes various functions of the base station control unit 109. The base station control unit 109 controls the whole base station 100.

The call control unit 110 processes an event or various message which are notified by the operation unit 105, the fixed-line I/F unit 101, or the CDL protocol control unit 108 (the portable handset 200). The call control unit 110 controls the call status of the base station 100 and conducts a call connection. "Controlling the call status" means, for example, detecting an outgoing call and an incoming call. Also, the call control unit 110 performs output/stop control of ringtones. The call control unit 110 notifies various internal events, such as a key input to handset and a remote control command (directive) over the portable music player 30, to the handset remote control unit 111 and the music player control unit 113. Therefore, when the call control unit 110 detects an incoming call from the PSTN 40, the call control unit 110 stops the speaker 129 outputting audio data which is transmitted from the portable music player 30, and the speaker 129 outputs a ringtone.

Figure 3:
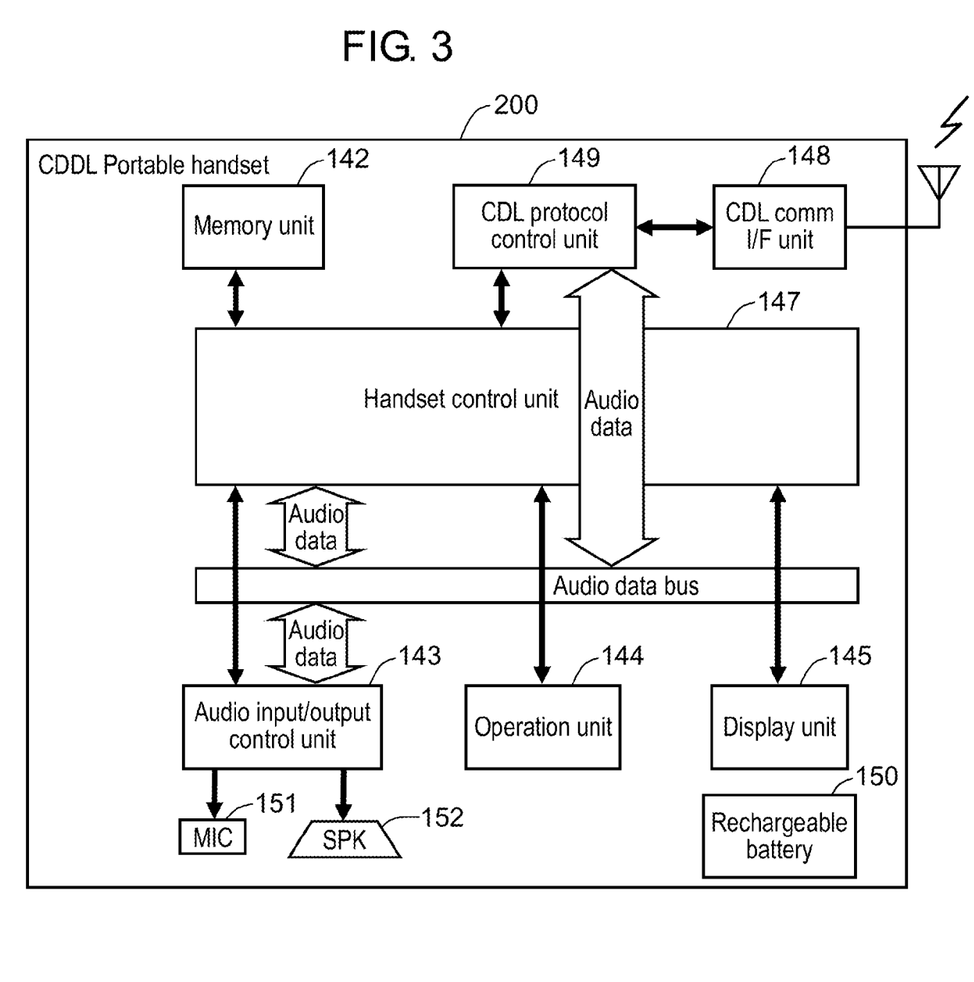
FIG. 3 is a block diagram showing the configuration of a portable handset in accordance with an embodiment of the present invention.

The handset remote control unit 111 controls the portable handset 200 as a remote controller for remotely controlling the portable music player 30. For example, when the portable handset 200 performs as the remote controller of the portable music player 30, the handset remote control unit 111 compiles information of a remote control screen, which is displayed on a display unit 145 of the portable handset 200, for helping remotely controlling the portable music player 30, and transmits the information to the portable handset 200. The information of the remote control screen is generated, for example, based on a correspondence relation between a process of the remote control command over the portable music player 30 and a key operation, which is provided in the an operation unit 144 of the portable handset 200, for performing the process.

The handset remote control unit 111 retrieves the key information, which is received via the CDL comm I/F unit 107, from the portable handset 200 via the call control unit 110. And the handset remote control unit 111 retrieves remote control operating information, which corresponds to keys of displayed remote control screen information, of the portable music player 30 such as play, stop, and pause procedures. Also, the handset remote control unit 111 notifies the music player control unit 113 of the remote control information which corresponds to the appropriate remote control. And, when the key operation of the portable handset 200 corresponds to volume control, the handset remote control unit 111 sends instructions of volume control to the audio input/output control unit 104.

The audio stream processing unit 112 performs connection procedure control for audio stream communication from the portable music player 30. The audio stream processing unit 112 establishes an audio path between the Bluetooth control unit 123 and the audio input/output control unit 104 in order that the speakers 129 and 130 output audio stream data which is transmitted from the portable music player 30. The audio path between the Bluetooth control unit 123 and the audio input/output control unit 104 may be established via the audio stream processing unit 112 as a buffer between the Bluetooth control unit 123 and the audio input/output control unit 104. Also, the audio path between the Bluetooth control unit 123 and the audio input/output control unit 104 may be established via the audio buss of between the Bluetooth control unit 123 and the audio input/output control unit 104 without passing through the audio stream processing unit 112.

Also, if the audio stream data is received via the wireless LAN comm I/F unit 122, the audio stream processing unit 112 buffers the audio stream data. And then, the audio path between the Bluetooth control unit 123 and the audio input/output control unit 104 may be established via the audio buss.

The connection procedure for audio stream communication is normally A2DP (Advanced Audio Distribution Profile) in case of Bluetooth communication. However RTSP (Real Time Streaming Protocol) or other audio streaming protocols may be applicable.

The music player control unit 113 controls a status of the portable music player 30 and remotely controls the portable music player 30. The music player control unit 113 sends, to the portable music player 30 via wireless networks, remote control information, such as information of play, stop, and pause procedures, for remotely controlling the portable music player 30.

The remote control information may be generated based on information which is input via the operation unit 105 of the base station 100 as well as via the operation unit 144 of the portable handset 200. A communication procedure for remotely controlling the portable music player 30 by the base station 100 may be a unique control message which is exclusively for the portable music player 30 and the base station 100. If the portable music player 30 and the base station 100 communicate by Bluetooth protocol, AVRCP (Audio/Video Remote Control Profile) may be applicable for remotely controlling the portable music player 30.

The wireless LAN control unit 121 and the wireless LAN comm I/F unit 122 communicate data by connecting with an external wireless LAN device in accordance with the wireless LAN standard IEEE 802.11.

The Bluetooth comm I/F unit 124 is a RF unit which transmits and receives radio signals which are in accordance with the Bluetooth standard via an antenna. The Bluetooth control unit 123 performs baseband control such as a control command to the RF unit, communication link control, and packet control.

The Bluetooth comm I/F unit 124 may wirelessly connect to the portable music player 30 and the base station 100 by Bluetooth.

The answer phone control unit 125, for example, stores an answering machine message and performs control of recording and playing the message.

The handset/mobile terminal charge unit 126 charges rechargeable batteries which are installed in, for example, the portable handset 200, the portable music player 30, or other mobile terminals. The handset/mobile terminal charge unit 126 may include a docking part where the mobile terminal is placed and a charging terminal. Also, the handset/mobile terminal charge unit 126 may wirelessly charge batteries in accordance with the wireless charging standard Qi or the like.

The USB comm I/F unit 127 is a communication interface which connects various devices which is in accordance with the USB standard such as the portable music player 30 to the base station 100. The USB comm I/F unit 127, for example, may function as a power feeding unit which feeds to the portable handset 200 or the portable music player 30.

Two speakers 129 and 130 as stereo speakers are shown in FIG. 2. However, one speaker as a monaural speaker is applicable.

Next is an explanation of an example of the portable handset 200.

FIG. 3 is a block diagram showing the configuration of a portable handset.

The portable handset 200 includes a memory unit 142, an audio input/output control unit 143, an operation unit 144, a display unit 145, a handset control unit 147, a CDL comm I/F unit 148, a CDL protocol control unit 149, a rechargeable battery 150, a microphone (MIC) 151, and a speaker (SPK) 152.

The memory 142 unit includes a volatile memory (RAM) and a non-volatile memory (ROM, EPROM or the like). The memory 142 unit stores various programs and various information such as information in a telephone book, and information of incoming and outgoing calls.

The audio input/output control unit 143 performs control of an audio signal input to the microphone 151 and an audio signal output from the speaker 152. The audio signal which is output from the speaker 152 may be, for example, a ringtone, telephone voice, an answering machine message.

The operation unit 144 may include a plurality of buttons which can be used by the user and the user inputs operation information with the operation unit 105. The buttons may include, for example, dial keys which are necessary to make a call, function keys which have various functions, a soft key for activating a function which is displayed according to a display position, arrow keys corresponding to upward, downward, rightward, and leftward directions. The operation unit 144 may be a touch panel which is superposed on the display unit 145.

The display unit 145 includes a liquid crystal monitor and a driver of the liquid crystal monitor. The display unit 145 shows various information such as information of a telephone number, information about the other side of the communication, and operation guide information. Also, the display unit 145 shows remote control screen when the portable handset 200 functions as a remote controller of the portable music player 30.

The handset control unit 147 includes a hardware which mainly includes a microcomputer. The handset control unit 147 runs a program which is incorporated in advance, and executes various functions of the handset control unit 147. The handset control unit 147 controls the whole of the portable handset 200.

The CDL comm I/F unit 148 includes a transmitting and receiving circuit which is for wirelessly communicating with the base station 100. The CDL comm I/F unit 148 is a RF unit which transmits and receives radio signals via an antenna.

The CDL protocol control unit 149 is a protocol stack unit which transmits and receives data to/from the base station 100. The CDL protocol control unit 149 performs protocol control according to a controlling protocol method (for example, DECT protocol method, PHS protocol method, and WDCT protocol method) used between the base station 100 and the portable handset 200.

The rechargeable battery 150 supplies power to all parts of the portable handset 200. The rechargeable battery 150 is, for example, recharged when the portable handset 200 is placed on the handset/mobile terminal charge unit 126 of the base station 100.

Next is an explanation of an example of the portable music player 30.

The portable music player 30 has a general construction which is not shown in figures. The portable music player 30, for example, has a radio communication unit, a control unit, a memory, an audio-playing application unit, an operation unit, a display unit, and an audio output unit. The radio communication unit wirelessly communicates with a base station 10 by Bluetooth or the like which is near field communication. The control unit controls the whole of the portable music player 30. The memory stores various data including music data. The audio-playing application unit plays music by software which is run by the control unit. The audio-playing application unit includes a function of stream transmitting and a function of remote control. The audio output unit includes a speaker and an earphone jack. Cellular phones and smartphones with the above construction are examples of the portable music player 30.

Music data which is reproduced by the portable music player 30 may be stored in the memory of the portable music player 30, be retrieved from an external sever by using a radio communication function or be retrieved from an external memory such as a memory card and an USB memory.

Next is an explanation of an example of the cordless telephone system 1.

Figure 4:
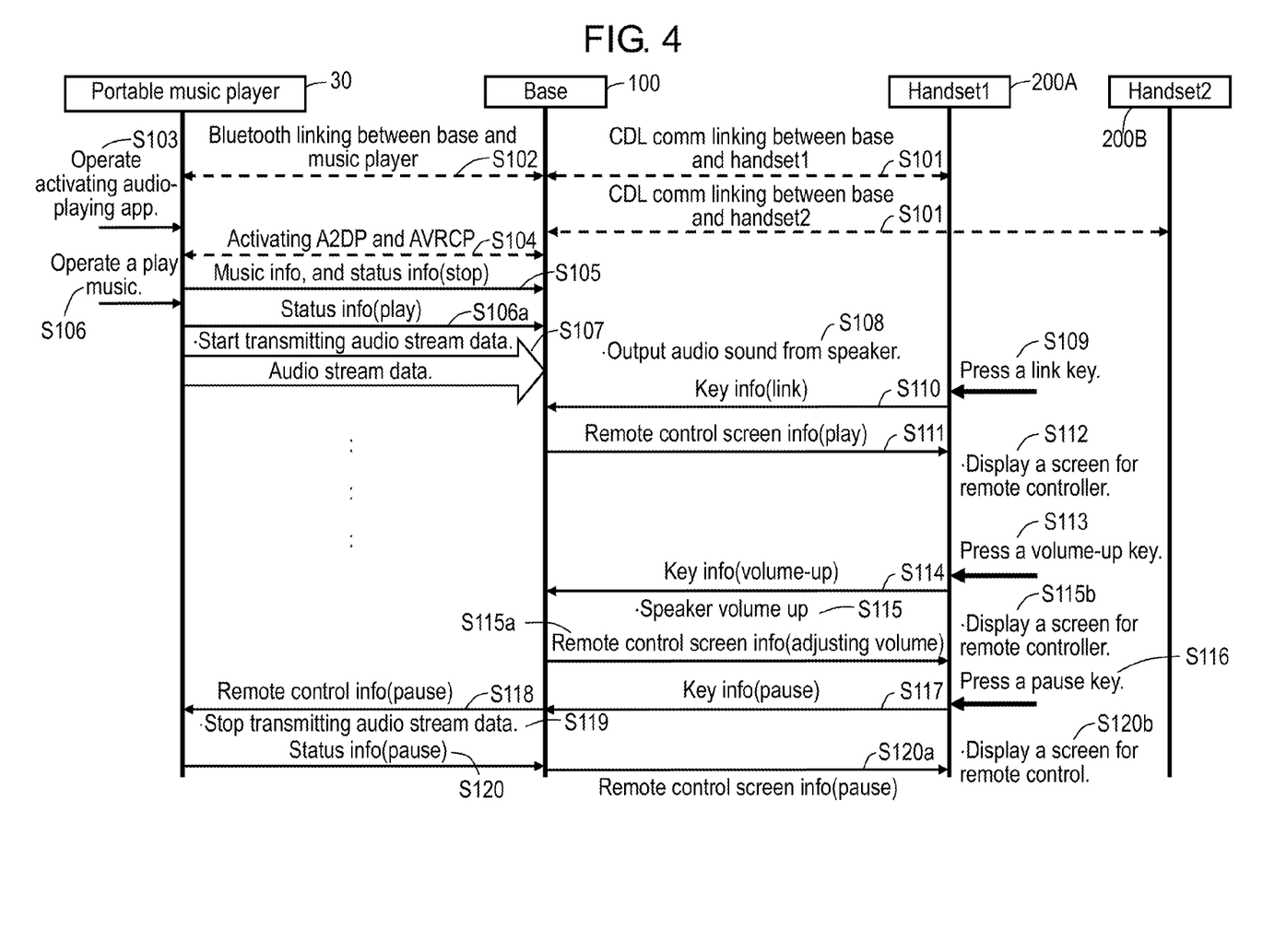
FIG. 4 is a sequence diagram showing an example of a behavior of the cordless telephone apparatus and the portable music player which operate in conjunction in accordance with an embodiment of the present invention.

In the cordless telephone system 1, the cordless telephone apparatus CDL system 10 and the portable music player 30 operate in conjunction. FIG. 4 is a sequence diagram showing a first example of a behavior of the base station 100, the portable handset 200, and the portable music player 30 which operate in conjunction. In FIG. 4, the portable handset 200A is mainly operated as a remote controller.

At first, between the base station 100 and the portable handsets 200A and 200B, the CDL protocol control unit 108 of the base station 100 and the CLD protocol control unit 149 of the portable handset 200 are linked by radio communication such as DECT. The link between the base station 100 and the portable handsets 200 is established and the base station 100 and the portable handsets 200 are in a standby mode (S101).

Between the base station 100 and the portable music player 30, the Bluetooth control unit 123 of the base station 100 and the portable music player 30 are linked by Bluetooth (S102). Therefore, the base station 100 and the portable music player 30 are paired. Between the portable music player 30 and the base station 100, the portable music player 30 streams audio data to the Base station 100 by A2DP, the base station 100 remotely controls the portable music player 30 by AVRCP.

A2DP is one of the Bluetooth profiles which is a communication protocol defined according to type of Bluetooth device. A2DP defines a procedure for streaming audio data, which means receiving data and playing back immediately. In this embodiment, the portable music player 30 is a streaming source side (SRC) and the base station 100 is a streaming sink side (SNK).

Also, AVRCP is adopted to remotely control a wireless earphone or the like which is Bluetooth-compatible. AVRCP is a Bluetooth profile for remotely controlling a main body such as a music player by a remote control.

Audio data is transmitted from the portable music player 30 to the base station 100 by operating the portable music player 30 and the base station 100 according to the procedure of A2DP. The base station 100 can receive audio data and play back immediately.

A data format of the audio data which is streamed is, for example, SBC (Sub band Codec), MP3 (MPEG (Moving Picture Experts Group) Audio Layer-3), AAC (Advanced Audio Coding), ATRAC (Adaptive Transform Acoustic Coding), or the like.

And then, for example, a user operates the portable music player 30 and run an audio-playing application of the portable music player 30 (S103). Once the portable music player 30 starts the music-playing application, the portable music player 30 wirelessly connects to the base station 100 for streaming audio data and remotely controlling by A2DP and AVRCP (S104).

Once the procedure of AVRCP is completed, the portable music player 30, for example, transmits, to the portable music player 30, status information which shows the status of the portable music player 30 and music information about audio data which is stored in the portable music player 30 or which is available (S105). The music information which is about audio data includes, for example, an album title, an artist name, a music title, and a track number. The music information is transmitted from the portable music player 30 to the base station 100 at the right time.

Also the portable music player 30 transmits, to the base station, the status information which includes a status change when the status of the portable music player 30 changes because the user operates the portable music payer 30 directly or the base station 100 remotely controls the portable music player 30. The status includes play status, stop status, and pause status.

Regarding the base station 100, the music player control unit 113 receives the music information and/or the status information from the portable music player 30 via the Bluetooth comm I/F unit 124 and stores the information to the memory unit 103. The music information and the status information are used as needed. For example, the music information and the status information are displayed on the display unit 106 of the base station 100 and the display unit 145 of the portable handset 200 at a predetermined time.

The portable music player 30 starts to reproduce the audio data when, for example, the user operates the portable music player 30 directly and when the user operates the portable handset 200 which functions as a remote controller of the portable music player 30. In FIG. 4, the user operates the operation unit of the portable music player 30 to play the selected music after the audio-playing application is activated (S106).

With this, the status of the portable music player 30 changes from a stop status to a play status. Therefore, the portable music player 30 transmits, to the music player control unit 113 of the base station 100, play status information, which indicates that the portable music player 30 is playing music. The music player control unit 113 updates the status of the portable music player 30 to the play status (S106a).

Then, the portable music player 30 transmits audio data which is stored in the portable music player 30 or which is available to the portable music player 30 to the base station 100 as, for example, audio stream data (S107).

Regarding the base station 100, the Bluetooth control unit 123 receives the audio stream data from the portable music player 30 via the Bluetooth comm I/F unit 124. The audio stream data is input to the audio input/output control unit 104 via the audio bus, is converted into analog sound, and is output from the speakers 129 and 130 (S108).

Therefore, the speakers 129 and 130 of the base station 100 are used as external speakers of the portable music player 30 when the portable music player 30 reproduces the audio data.

Regarding the portable handset 200A, if the user presses the function key such as a link key, which is for starting linking to the portable music player 30, when the display unit 145 shows a predetermined menu of functions, the operation unit 144 detects that the link key is pressed (S109). Once the link key is pressed, the portable handset 200A transmits, to the base station 100, a message of key information, which indicates a request for starting a link to the portable music player 30 (S110).

In the above explanation, once the dedicated function key for linking to the portable music player 30 is pressed, the portable handset 200 starts to operate as a remote controller of the portable music player 30. However, the portable handset 200 may start to operate as the remote controller once a function for linking to a music player is chosen from functions which are displayed in the menu of the portable handset 200A based on a set of key operations for activating the remote control operation.

Regarding the base station 100, once the CDL comm I/F unit 107 receives the message of key information (link key) from the portable handset 200A, the CDL comm I/F unit 107 transmits, to the call control unit 110, the message of key information and detects that the key information which is received by the call control unit 110 is the link key.

Once the call control unit 110 detects that the key information is the link key, the status of the portable handset 200A is updated to a remote control status and the handset remote control unit 111 is notified that the portable handset 200A is activated as the remote control.

Once the handset remote control unit 111 is notified that the portable handset 200A is activated as the remote controller, the handset remote control unit 111 generates information of the remote control screen and transmits the information to the portable handset 200A (S111). The information of the remote control screen includes, for example, music information and status information which are transmitted from the portable music player 30. And the information of the remote control screen may also include information of functions which are assigned to each key of the portable handset 200A when the portable handset 200A operates as the remote controller of the portable music player 30 and information of various parameters and control requirements to operate the portable handset 200A as the remote controller.

Figure 5A:
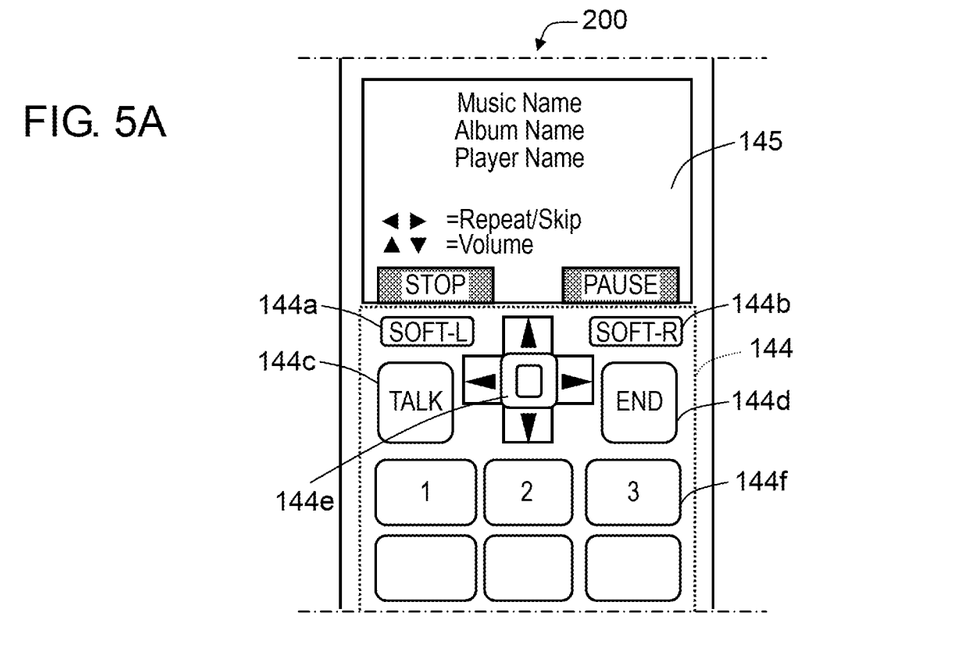
FIGS. 5A, 5B and 5C are schematic views showing a relation between a status change and a screen transition of the portable handset in accordance with an embodiment of the present invention.

Regarding the portable handset 200A, the CDL comm I/F unit 148 receives, from the base station 100, the information of the remote control screen when the portable music player 30 is playing, and the display unit 145 shows a remote control screen which is shown in FIG. 5A (S112). The user of the portable handset 200A can check a content which is shown on the remote control screen of the portable handset 200A and operate it to remotely control the portable music player 30. Therefore, the portable music player 30 is remotely controlled by operating the portable handset 200A when the portable music player 30 and the base station 100 are linked to each other.

For example, play, pause, stop, fast-forward, play next track, fast-rewind, play previous track, and volume up/down procedures are remotely performed.

Regarding the portable handset 200A, if the operation unit 144 detects the key input for volume up (S113), the CDL comm I/F unit 148 transmits the key information of volume up procedure to the base station 100 (S114).

In this case, the CDL comm I/F unit 107 receives a message of the key information of volume up procedure and transmits it to the call control unit 110 in the base station 100.

Once the call control unit 110 is notified that the portable handset 200A is operated as the remote controller, the call control unit 110 transmits the key information of volume up procedure to the handset remote control unit 111

The call control unit 111 sends a command for turning up the volume of the speakers 129 and 130 to the audio input/output control unit 104 (S115). At that time, the call control unit 111 may generate information of the remote control screen for volume control and send the information to the portable handset 200A (S115a).

Figure 5B:
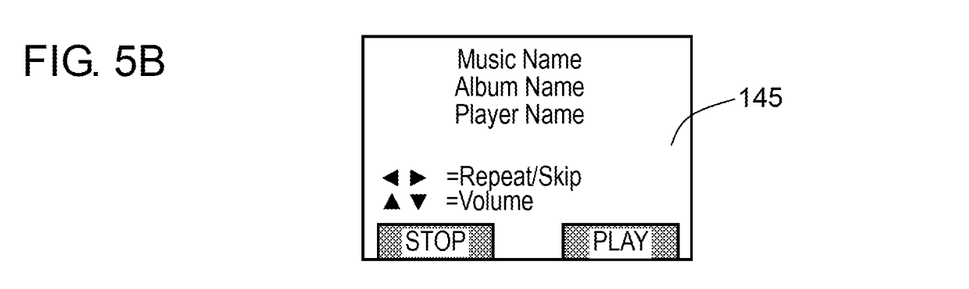

Regarding the portable handset 200A, the CDL comm I/F unit 148 receives, from the base station 100, the information of the remote control screen for volume control and the display unit 145 shows the remote control screen which is, for example, shown in FIG. 5B (S115b). If the operation unit 144 detects input for pause procedure (S116), the CDL comm I/F unit 148 transmits, to the base station 110, a message of key information of pause procedure (S117).

In this case, regarding the base station 100, the CDL comm I/F unit 107 receives the message of the key information of pause procedure and transmits the message to the call control unit 110 in the base station 100.

Once the call control unit 110 acknowledges that the portable handset 200A functions as a remote controller, the call control unit 110 transmits the key information of pause procedure to the handset remote control unit 111.

Once the handset remote control unit 111 receives the message of key information of pause procedure, the handset remote control unit 111 directs the pause procedure to the music player control unit 113.

Once the music player control unit 113 receives the directive of pause procedure from the handset remote control unit 111, the music player control unit 113 transmits remote control information to the portable music player 30 via the Bluetooth control unit 123 (S118). The remote control information includes information of pause procedure of the portable music player 30.

Once the portable music player 30 receives the remote control information which includes directive information of pause procedure from the base station 100, the portable music player 30 pauses the audio data, which is being played, and stops transmitting the audio stream data to the base station 100 (S119). Also, the portable music player 30 transmits, to the base station 100, pause status information (S120).

Regarding the base station 100, the music player control unit 113 receives the pause status information, updates the status of the portable music player 30 to the pause status, and notifies the status change to the handset remote control unit 111. The handset remote control unit 111 generates a remote control screen for the pause procedure and transmits, to the portable handset 200A, the remote control screen, which is the remote controller (120a).

Figure 5C:
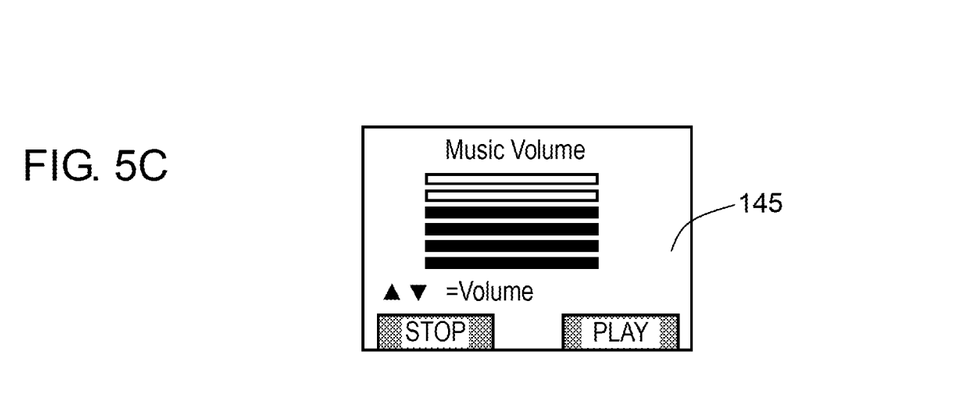

Regarding the portable handset 200A, the CDL comm I/F unit 148 receives the information of remote control screen of pause procedure from the base station 100 and the display unit 145 shows a remote control screen which is, for example, shown in FIG. 5C (S120b).

According to the above first example, the speakers 129 and 130 of the base station 100 are used as the external speakers when the portable music player 30 reproduces the audio data. Also, the portable handset 200 is used as the remote controller of the portable music player 30.

And the user does not need to move to near the portable music player 30 when the user operates the portable music player 30 because the portable handset 200 functions as the remote controller. This increases flexibility of an audio environment to the user. Furthermore, in above explanation, the portable music player 30 is remotely controlled by operating the portable handset 200A. The portable handset 200B may also remotely control the portable music player 30 in collaboration with the portable handset 200A by pressing a link key, which is provided for the portable handset 200B, for linking to the portable music player 30 when the portable handset 200A is operated as the remote controller.

Also, in the above explanation, the portable music player 30 activates the audio-playing application. However the base station 100 may start transmitting audio stream data. In this case, for example, when the link key of the portable handset 200 is pressed and the portable handset 200 transmit information of the link key to the base station 100, the base station 100 may request, to the portable music player 30, a connection by use of an audio streaming procedure of A2DP and AVRCP and a remote control procedure (S104). Also, the portable music player 30 may activate the audio-playing application based on a remote control from the base station 100.

Next is an explanation of one example of the remote control screen which is displayed on the display of the portable handset 200.

FIGS. 5A, 5B and 5C are schematic views showing an example of a relation between a status change and a transition of the remote control screen of the display unit 145 of the cordless telephone system 10. FIG. 5A is a schematic view showing an example of the remote control screen when the portable music player is in play status. FIG. 5B is a schematic view showing an example of the remote control screen when the portable music player is in pause status. FIG. 5C is a schematic view showing an example of the remote control screen when the portable music player is in volume-controlling status. In FIG. 5A, a part of the operation unit 144 as well as the remote control screen which is shown on the display unit 145 is described. However in FIG. 5B and FIG. 5C, the part of the operation unit 144 is left out.

The handset remote control unit 111 edits information of the remote control screen in accordance with the status information and music information which are retrieved from the portable music player 30 and transmits the information of the remote control screen to the portable handset 200.

Also, when the status of the portable music player 30 or a track which is played by the portable music player 30 is changed by operating the portable music player 30 directly or operating the portable handset 200 as the remote controller, the status information and the music information are sent to the base station 100 almost immediately. The base station 100 detects the change of the status information or the music information. The change of the status information and the music information are displayed on the remote control screen of the portable handset 200. The portable handset 200 may transmit the status information or the music information to the base station 100 by key operation of the portable handset 200.

In FIG. 5A and FIG. 5B, the display unit 145 displays various information such as a tile of a track which is being played, an album title, an artist, an operation guide of the remote controller, and a function which is assigned to a soft key. The soft keys include a left side soft key (SOFT_L) and a right side soft key (SOFT_L).

The operation unit 144 includes a left side soft key 144a, a right side soft key 144b, a talk key 144c, a call end key 144d, a navigation key (a cross shape key) 144e, and a dial key 144f.

In FIG. 5A to FIG. 5C, a volume up procedure is assigned to the up allow key of the navigation key 144e and a volume down procedure is assigned to the down allow key of the navigation key 144e. In FIG. 5A and FIG. 5B, a repeat operation is assigned to the left allow key of the navigation key 144e and a skip operation is assigned to the right allow key of the navigation key 144e.

In FIG. 5A, a stop procedure is assigned to the left side soft key 144a and a pause procedure is assigned to the right side soft key 144b. In FIG. 5B, a stop procedure is assigned to the left side soft key 144a and a play procedure is assigned to the right side soft key 144b.

According to the cordless telephone system 10 of the above embodiment, the speakers 129 and 130 of the base station 100 are used as the external speakers of the portable music player 30 when the portable music player 30 reproduces audio data. Therefore, the user may not need to buy a dedicated external speaker and connect the external speaker to the portable music player 30. The audio data may be output from the speakers 129 and 130 of the base station 100.

Also, the portable handset 200 may be used as a remote controller of the portable music player 30 when the portable music player 30 reproduces the audio data. The portable handset 200 is easy to grasp and has good operability because a shape or a size of the portable handset 200 is not limited. Therefore, if the operability of the portable music player 30 is not good, the operability may be improved by linking the portable handset 200 to the portable music player 30 to use the portable handset 200 as a remote controller of the portable music player 30.

The status information and the music information of the portable music player 30 may be forwarded to the portable handset 200. A user may be able to remotely control the portable music player 30 by the portable handset 200.

Also, the base station 100 and the portable music player 30 may be wirelessly connected to each other. The base station 100 and the portable music player 30 do not need to be physically connected to each other. The user may not need to move close to the base station 100 from where the user listens to the music in order to operate the portable music player 30 when the user performs various operations such as volume adjusting procedure, track selection procedure, play procedure, and stop procedure. This improves the operability o In this way, the link between the portable music player 30 and the base station 10 may be improved and a comfortable audio environment may be realized when the audio data of the portable music player 30 is reproduced.

The present invention is not limited to the above embodiment. Any constitution which enables the function described in the claims and the functions of the above embodiment is applicable.

For example, the remote control screen helps the user's operation of the portable handset 200 in a visual way in the above embodiment. However other ways such as voice synthesis and voice recognition may help user's operation.

The cordless telephone apparatus and the control method of the same may improve a function linkage between a music player and a cordless telephone apparatus when the music player reproduces audio data.

The present application claims priority from Japanese Patent Application No. 2013-242171 filed on Nov. 22, 2013, the contents of which are incorporated herein by reference.

What is claimed is:

1. A cordless telephone apparatus comprising:
a portable handset; and a base station,
the base station including:
a first wireless communicator which, in operation, performs radio communication with a music player;
a first controller which, in operation, monitors a status of the music player and remotely controls the music player via the first wireless communicator;
a speaker which outputs audio data;
an audio processor which, in operation, reproduces the audio data received by the first wireless communicator from the music player and outputs the audio data to the speaker;
a second wireless communicator which performs radio communication with the portable handset; and
a second controller which, in operation, controls the portable handset as an operation unit to remotely control the music player, wherein
when the second controller receives from the portable handset first key information defined to remotely control the music player, the second controller transmits to the music player remote control information which corresponds to the first key information; and
when the second controller receives from the portable handset second key information defined to adjust a volume, the second controller controls the volume of the speaker without remotely controlling the music player.

2. The cordless telephone apparatus according to claim 1, wherein the base station transmits display information, to be displayed on a display unit of the portable handset, to the portable handset when the base station receives from the portable handset link start information for starting remote control of the music player.

3. The cordless telephone apparatus according to claim 2, wherein the display information includes information regarding operational entry display for use when the portable handset functions as the operation unit to remotely control the music player.

4. The cordless telephone apparatus according to claim 2, wherein the base station receives music information of the audio data or status information of the music player from the music player, and
the display information includes the music information and the status information.

5. The cordless telephone apparatus according to claim 4, wherein the base station transmits the display information to the portable handset when the base station detects a change in the music information or the status information.

6. The cordless telephone apparatus according to claim 1, wherein when the base station receives information regarding a defined key from the portable handset functioning as the operation unit to remotely control the music player, the base station transmits remote control information to the music player, wherein the remote control information includes directive information that directs remote control of the music player according to the defined key.

7. The cordless telephone apparatus according to claim 6, wherein the directive information includes information that directs a play procedure, a stop procedure, and a pause procedure of the audio data to the music player.

8. The cordless telephone apparatus according to claim 1, wherein
when the base station receives information regarding a defined key from the portable handset functioning as the operation unit to remotely control the music player, the base station transmits remote control information to the music player, wherein the remote control information includes directive information that directs remote control of the music player according to the defined key.

9. The cordless telephone apparatus according to claim 8, wherein the directive information includes information that directs a play procedure, a stop procedure, and a pause procedure of the audio data to the music player.

10. The cordless telephone apparatus according to claim 1, wherein
a communication method of the first wireless communicator conforms to IEEE802.15.1 standard.

11. A cordless telephone apparatus comprising:
a portable handset; and a base station,
the base station including:
a first wireless communicator unit which, in operation, performs radio communication with a music player;
a speaker which outputs audio data;
an audio processor unit which, in operation, reproduces the audio data received by the first wireless communicator unit from the music player and outputs the audio data to the speaker;
a second wireless communicator unit which performs radio communication with the portable handset; and
a remote controller which is capable of allowing the portable handset to remotely control the music player,
wherein, in case when the speaker outputs the audio data from the music player and when the base station receives from the portable handset key information defined to adjust a volume, the remote controller does not allow for remote control of the music player and instead controls a volume of the speaker.

12. The cordless telephone apparatus according to claim 11, wherein the base station transmits display information, to be displayed on a display unit of the portable handset, to the portable handset when the base station receives link start information for starting remote control of the music player.

13. The cordless telephone apparatus according to claim 12, wherein the display information includes information regarding operational entry display for use when the portable handset functions as an operation unit to remotely control the music player.

14. The cordless telephone apparatus according to claim 12, wherein the base station receives music information of the audio data or status information of the music player from the music player, and
the display information includes the music information and the status information.

15. The cordless telephone apparatus according to claim 14, wherein the base station transmits the display information to the portable handset when the base station detects a change in the music information or the status information.

16. The cordless telephone apparatus according to claim 11, wherein a communication method of the first wireless communicator conforms to IEEE802.15.1 standard.

17. A control method implemented by a base station of a cordless telephone apparatus, which includes a portable handset and the base station, the method comprising:
connecting to a music player wirelessly;
outputting audio data, which the base station receives from the music player, to a speaker of the base station;
transmitting display information for remotely controlling the music player to the portable handset when the base station receives link start information for starting remote control of the music player, wherein
when the base station receives from the portable handset first key information defined to remotely control the music player, the base station transmits to the music player remote control information which corresponds to the first key information; and
when the base station receives from the portable handset second key information defined to adjust a volume, the base station controls the volume of the speaker without remotely controlling the music player.

18. A control method implemented by a base station of a cordless telephone apparatus, which includes a portable handset and the base station, the method comprising:
connecting to a music player wirelessly;
outputting audio data, which the base station receives from the music player, to a speaker of the base station;
selectively allowing the portable handset to remotely control the music player; and
in case when the speaker outputs the audio data from the music player and when the base station receives from the portable handset key information defined to adjust a volume, not allowing for remote control of the music player and instead controlling a volume of the speaker of the base station.

* * * * *